W. H. DRAUGHON.
PLATFORM SCALE.
APPLICATION FILED MAY 7, 1912.

1,053,718.

Patented Feb. 18, 1913.

WITNESSES
F. D. Sweet
P. B. Marshall

INVENTOR
William H. Draughon
BY Munn & Co
ATTORNEYS

UNITED STATES PATENT OFFICE.

WILLIAM H. DRAUGHON, OF NASHVILLE, TENNESSEE, ASSIGNOR OF ONE-TENTH TO L. H. MONTGOMERY, OF NASHVILLE, TENNESSEE.

PLATFORM-SCALE.

1,053,718.   Specification of Letters Patent.   Patented Feb. 18, 1913.

Application filed May 7, 1912. Serial No. 695,648.

*To all whom it may concern:*

Be it known that I, WILLIAM H. DRAUGHON, a citizen of the United States, and a resident of Nashville, in the county of Davidson and State of Tennessee, have invented a new and useful Improvement in Platform-Scales, of which the following is a full, clear, and exact description.

My invention relates to that class of platform scales having the platform supported above the weighing lever.

The object of this invention is (1) to provide means for causing all parts of the platform to move vertically at the same velocity at any point of the arc described by the weighing lever; and (2) to reduce wear and friction in the moving parts of said means. The means heretofore employed for the first mentioned purpose may be adjusted so as to accomplish the desired result while the weighing lever is occupying a certain position (a substantially horizontal position), but as the lever passes from this position the imperfections of the means heretofore used are such that, under certain conditions, a perfectly parallel movement of the platform is not maintained.

The exact nature of my invention will be understood from the following complete description and the accompanying drawings, in which the preferred form of the invention is disclosed.

Figure 1:
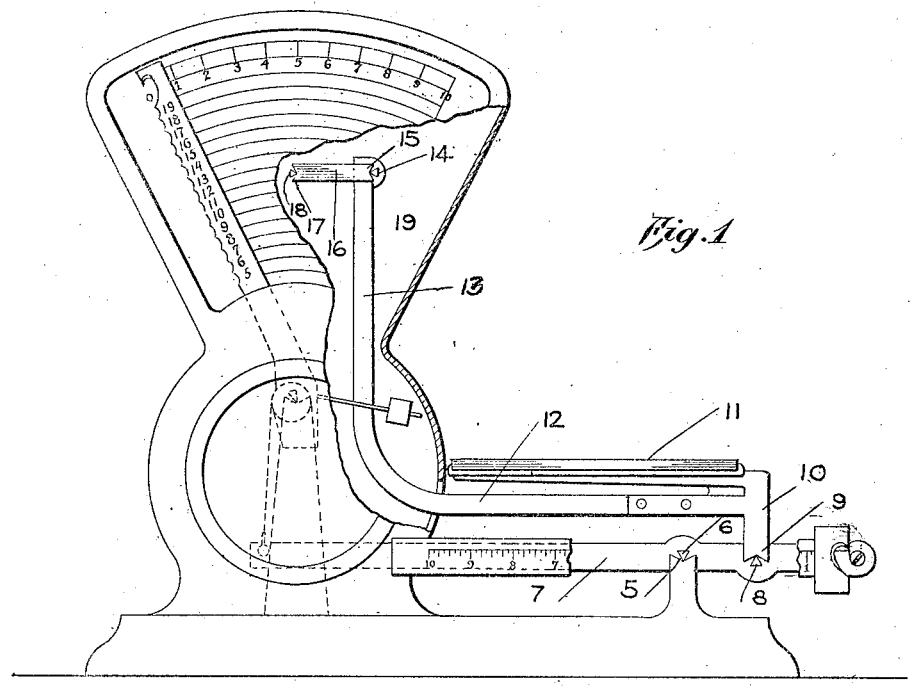
Figure 2:
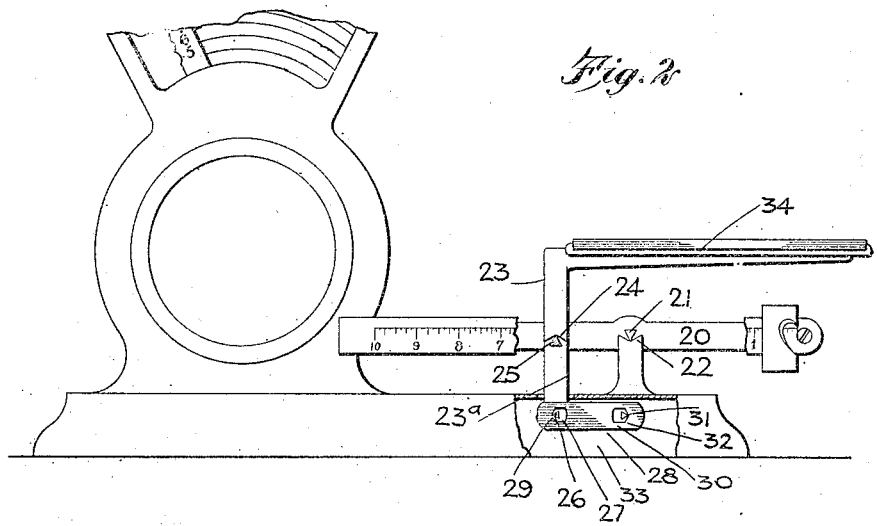

Figure 1 is a sectional elevation showing one type of scale provided with my improvement; and Fig. 2 is an elevation, partially in section, showing another type of scale provided with my invention.

By referring to the drawings it will be seen that the scale shown in Fig. 1 is provided with a fulcrum bearing 5, which may be constructed of agate or steel, and in which is disposed the fulcrum 6, which is secured to the lever 7. At a short distance from the fulcrum 6 the lever 7 is provided with a second knife-edge 8, on which rests the agate or steel bearing 9, with which the supporting member is provided. On this supporting member, and disposed to the left, there is a platform 11, and also secured to this supporting member 10 there is a guide arm 12, which is bent and has an upwardly extending portion 13 carrying a knife-edge 14, which engages a steel or agate bearing 15 on the guide link 16. At the opposite end of the guide link 16 is another agate or steel bearing 17, with which engages the knife edge 18, which is supported by the frame 19.

The knife-edges 6, 8, 14 and 18 should be so disposed that a straight line drawn from the lower edge of 6 to the upper edge of 8 shall be parallel with and exactly equal to a straight line drawn from the edge of 14 to the edge of 18. This forms a well-known mechanical movement known as a "parallel movement," which is found in all scales of this class. The fundamental principle of this movement is: All parts of the various members forming the connection between the points 8 and 14 will always move in parallel lines and at exactly the same velocity.

My invention relates to the manner of supporting the platform above the knife-edge 8, and to the character of the bearings used in the guide link 16. Heretofore, the guide links have always been provided with orifices at each end, which loosely fit the pins used in the place of the knife-edges 14 and 18. It is necessary, with the old type of construction, to provide loose fits in these connections, because, if the pins should fit tightly in the orifices, the resulting friction would destroy the sensitiveness of the scale. In the old construction, furthermore, the platform is usually so disposed that its center is substantially in a vertical line with the knife-edge 8. Consequently, when a weight is moved from one side of the platform to the other, the clearance in the orifices of the link 16 would be taken up in different directions, thus causing the pin at 14 to swing about the pin at 18 at a varying radius. To illustrate, if the scale shown in Fig. 1 were built according to the old construction and a weight should be placed on the platform to the right of the point of support at 8, the pin at 14 would be forced so far to the right as the clearance in the orifices at 14 and 18 in the guide link would allow it to go. But if the weight should be moved across to the left edge of the platform the pin at 14 would be forced against the left side of the orifice in the guide link at 14 and the right side of the orifice at 18 would be forced against the pin at 18 so that the pin at 14 would revolve around the pin at 18 in an arc of perceptibly shorter radius than before. It is impossible to have a perfectly adjusted parallelogram under both conditions, and any variation from a perfect parallelogram necessarily results in a variation of the indicated weight of a given load when placed in different positions on the platform because all parts of the platform would not be moving at the same velocity and consequently the load would be acting with different "leverage" at different portions of the platform.

In the type of scale shown in Fig. 2 of the drawings, the lever 20 is provided with a knife edge member 21, which is fulcrumed on the agate or steel bearing 22, the platform support 23 having an agate or steel bearing 24, which rests on the knife edge member 25, secured to the lever 20. This platform support 23 extends below the knife edge member 25, and at its lower end 23ª it is provided with a knife edge 26, disposed in an opening 27 in the guide member 28, the knife edge 26 engaging a steel or agate bearing surface 29. This guide link 28 also has an opening 30, in which a knife-edge member 31 is disposed, the knife edge member 31 engaging an agate or steel bearing surface 32, on the guide link 28. The knife edge member 31 is secured to the frame 33 in the usual manner. In this construction, as the platform 34 is secured to the support 33, and extends to the right, it will tend at all times to hold the knife edge member 26 to the left, and in engagement with the steel or agate bearing surface 29 on the guide link 28. In this way the knife edge members 26 and 31 will be held against the bearing surfaces 29, and 32, without reference to the position in which the weight should be disposed on the platform 34. In other respects the construction shown in Fig. 2 corresponds with the construction shown in Fig. 1.

An examination of the drawings will show that I have overcome the faults in prior constructions by so mounting the platform with reference to its point of support on the lever, that a weight placed at any position on it will always exert the same kind of force on the link 16 or 28. In other words, if the construction is such as is shown in Fig. 1 the force exerted on the link will always be a force of compression. If the various members are disposed as shown in Fig. 2, the link will constantly sustain a force of tension. Not only does this arrangement maintain an absolute uniformity of the theoretical length of the link, but it also prevents the constant pounding of the link connections incident to the loading or unloading of the platform or the shifting the position of the load. Furthermore, this arrangement permits of the use of knife-edge bearings in the link connections, thereby further reducing wear and friction of the parts.

Having thus described my invention, I claim as new and desire to secure by Letters Patent:

1. In a scale, the combination of a frame, a lever fulcrumed relatively to the frame, a guide arm pivotally mounted upon the lever, a guide link articulated to the guide arm and to the frame, and a platform supported on the lever and connected with the guide arm in such a manner that the weight of the platform or of a load in any position on the platform will transmit pressure through the guide arm to the guide link always in the same direction.

2. In a scale, the combination of a frame, a lever fulcrumed relatively to the frame, a guide arm articulated to the lever, a guide link articulated to the guide arm and to the frame, a platform secured to the guide arm in such a manner that all parts of the platform are disposed on the same side of the vertical plane of the axis of oscillation at the point where the guide arm is articulated to the lever.

3. In a scale, the combination of a frame, a lever fulcrumed relatively to the frame, a guide arm articulated to the lever, a guide link articulated to the guide arm and to the frame by means of knife-edge members and bearings, and a platform supported on the lever and secured to the guide arm in such a manner that the weight of the platform or of a load in any position on the platform will always transmit pressure through the guide arm to the guide link in the same direction.

4. In a scale, a frame, a lever fulcrumed relatively to the frame, a guide arm mounted on the lever, a platform secured to the guide arm and disposed substantially at one side of the point at which the guide arm is mounted on the lever, a guide link, and knife-edge members and bearings for connecting the guide link with the guide arm and with the frame.

5. In a scale, a frame, a lever fulcrumed relatively to the frame, a guide arm mounted on the lever, a guide link articulated to the guide arm and to the frame, and a platform secured to the guide arm and disposed substantially at one side of the point at which the guide arm is mounted on the lever for maintaining at all times a pressure on the guide arm and in the same direction.

6. In a scale, a frame, a lever fulcrumed relatively to the frame, a guide arm mounted on the lever, a guide link, knife-edge members and bearings for connecting the guide link with the guide arm, and with the frame, a platform secured to the guide arm and disposed substantially at one side of the point at which the guide arm is mounted on the lever for maintaining at all times the pressure on the guide arm and in the same direction.

7. In a scale, the combination of a frame, a lever having a power and a weight arm and fulcrumed therebetween and relatively to the frame, a guide arm pivotally mounted on one arm of the lever, a guide link articulated to the guide arm and to the frame, and a platform supported on the last-mentioned arm of the lever, and connected with the guide arm in such a manner that the weight of the platform or a load in any position on the platform, will transmit pressure through the guide arm to the guide link in the same direction.

8. In a scale, the combination of a frame, a lever having a power arm and a weight arm, and fulcrumed therebetween and relatively to the frame, a guide arm articulated to one arm of the lever, a guide link articulated to the said guide arm and to the frame by means of knife-edge members, and bearings, and a platform supported on the last-mentioned arm of the lever and secured to the guide arm in such a manner that the weight of the platform or of a load in any position on the platform will always transmit pressure through the guide arm to the guide link in the same direction.

In testimony whereof I have signed my name to this specification in the presence of two subscribing witnesses.

WILLIAM H. DRAUGHON.

Witnesses:
 C. G. RING,
 D. C. RING.